(12) United States Patent
Luo et al.

(10) Patent No.: US 11,544,974 B2
(45) Date of Patent: Jan. 3, 2023

(54) COMPUTER-READABLE STORAGE MEDIUM, AND FAULT DETECTION METHOD AND APPARATUS

(71) Applicant: AUTEL INTELLIGENT TECHNOLOGY CORP., LTD., Guangdong (CN)

(72) Inventors: Yongliang Luo, Guangdong (CN); Feng Zeng, Guangdong (CN)

(73) Assignee: AUTEL UNITED-CREATION SOFTWARE DEVELOP CO., LTD., Guangdong (CN)

( * ) Notice: Subject to any disclaimer, the term of this patent is extended or adjusted under 35 U.S.C. 154(b) by 371 days.

(21) Appl. No.: 16/863,205

(22) Filed: Apr. 30, 2020

(65) Prior Publication Data
US 2020/0258326 A1   Aug. 13, 2020

Related U.S. Application Data

(63) Continuation of application No. PCT/CN2018/112437, filed on Oct. 29, 2018.

(51) Int. Cl.
   *G07C 5/08*   (2006.01)
   *B60C 23/04*   (2006.01)
   *G07C 5/00*   (2006.01)

(52) U.S. Cl.
   CPC ........ *G07C 5/0808* (2013.01); *B60C 23/0401* (2013.01); *B60C 23/0481* (2013.01); *G07C 5/006* (2013.01); *G07C 5/085* (2013.01)

(58) Field of Classification Search
   CPC ...... G07C 5/0808; G07C 5/006; G07C 5/085; G07C 5/0825; B60C 23/0401; B60C 23/0481; B60C 23/0471; B60C 23/0472; B60C 23/0479; G05B 23/0262; G05B 2219/24065
   See application file for complete search history.

(56) References Cited

U.S. PATENT DOCUMENTS

| 2002/0092345 A1* | 7/2002 | Van Niekerk | G01L 17/00 73/146 |
| 2002/0130771 A1* | 9/2002 | Osborne | B60C 23/008 340/441 |
| 2003/0110851 A1 | 6/2003 | Tsujita | |

(Continued)

FOREIGN PATENT DOCUMENTS

| CN | 102107591 A | 6/2011 |
| CN | 102463857 A | 5/2012 |

(Continued)

*Primary Examiner* — Rami Khatib (57) ABSTRACT

The present disclosure relates to a computer-readable storage medium, and a fault detection method and apparatus. The method includes: obtaining first data of tire pressure sensors of a vehicle in a stopping state and a running state; and performing fault detection according to the first data of the tire pressure sensors in the stopping state and/or the running state, and outputting a fault detection result. According to the solutions provided in the present disclosure, a fault type and a fault source can be quickly and accurately positioned, so that maintenance personnel perform fault maintenance quickly and safely, thereby reducing the costs of maintenance and detection, and effectively improving the efficiency and accuracy of fault detection.

17 Claims, 5 Drawing Sheets

(56) References Cited

U.S. PATENT DOCUMENTS

| | | | |
|---|---|---|---|
| 2003/0201188 A1 | 10/2003 | Schetty, III et al. | |
| 2010/0066522 A1* | 3/2010 | Ichikawa | B60C 23/0408 |
| | | | 340/442 |
| 2011/0148617 A1* | 6/2011 | Kusunoki | B60C 23/0401 |
| | | | 340/442 |
| 2016/0075193 A1 | 3/2016 | Huang | |
| 2019/0184774 A1* | 6/2019 | Okada | G07C 5/0808 |
| 2019/0329608 A1* | 10/2019 | Fraiss | B60C 23/0479 |

FOREIGN PATENT DOCUMENTS

| | | |
|---|---|---|
| CN | 102555697 A | 7/2012 |
| CN | 103273811 A | 9/2013 |
| CN | 103660809 A | 3/2014 |
| CN | 103832224 A | 6/2014 |
| CN | 103895459 A | 7/2014 |
| CN | 105711352 A | 6/2016 |
| CN | 106209982 A | 12/2016 |
| CN | 205970654 U | 2/2017 |
| CN | 107808460 A | 3/2018 |

\* cited by examiner

FIG. 3B ns technology is also gradually developed.

COMPUTER-READABLE STORAGE MEDIUM, AND FAULT DETECTION METHOD AND APPARATUS

This application is a continuation application of International Application No. PCT/CN2018/112437, filed on Oct. 29, 2018, which claims priority of Chinese Patent Application No. 201711051485.7, filed on Oct. 31, 2017, which is incorporated herein by reference in its entirety.

BACKGROUND

Technical Field

This application relates to the field of fault diagnosis, and in particular, to a computer-readable storage medium, and a fault detection method and apparatus.

Related Art

Currently, with development of wireless communications, this technology is widely applied to the fields of vehicles, aerospace, industrial production, consumption, and the like. In the field of fault diagnosis, the application of the wireless communications technology in the industry of tire pressure monitoring systems (TPMS) is also gradually developed.

Currently, a fault diagnosis solution based on the wireless communications technology is mainly aimed at fault diagnosis in a running state. The specific solution is as follows: collecting related information in a running state, for example, tire pressure, by using a built-in TPMS receiver of a vehicle, and performing fault detection on a tire according to the information.

In the foregoing solution, a provided fault detection result generally includes general information, for example, "tire pressure value display", and "tire pressure light on" or display of "tire pressure is faulty, and maintenance is needed" when the tire pressure is excessively low. However, the amount of information in the fault detection result is limited, maintenance personnel cannot quickly and accurately position the tire fault according to the fault detection result. Consequently, fault maintenance of the tire pressure system becomes extremely complex and the maintenance cost is very high.

SUMMARY

The present disclosure provides a computer-readable storage medium, and a fault detection method and apparatus. The technical solutions are as follows:

According to a first aspect of embodiments of the present disclosure, a fault detection method is provided. The fault detection method includes: obtaining first data of tire pressure sensors of a vehicle in a stopping state and a running state; performing fault detection according to the first data of the tire pressure sensors in the stopping state and/or the running state, and outputting a fault detection result.

According to a second aspect of embodiments of the present disclosure, a fault detection apparatus is provided. The fault detection apparatus includes: a first obtaining module, configured to obtain first data of tire pressure sensors of a vehicle in a stopping state; a second obtaining module, configured to obtain first data of the tire pressure sensors of the vehicle in a running state; and a processing module, configured to perform fault detection according to the first data of the tire pressure sensors in the stopping state and/or the running state, and output a fault detection result.

According to a third aspect of embodiments of the present disclosure, a fault detection apparatus is provided. The fault detection apparatus includes: a processor; and a memory configured to store a computer program, where the processor performs the steps of the foregoing method.

According to a fourth aspect of embodiments of the present disclosure, a computer-readable storage medium is provided, storing a computer program, where when the program is executed by a processor, the steps of the foregoing method are implemented.

The technical solutions provided in the embodiments of the present disclosure may include the following beneficial effects:

Related data of tire pressure sensors is obtained when a vehicle is in a stopping state and a running state. According to the data obtained in the stopping state and/or the running state and a type of fault needing to be detected currently, detection is performed according to a corresponding fault detection process, to determine a specific type of fault occurring currently and position a fault source accurately. According to the solution, for different fault types, corresponding data is obtained, and detection is performed based on the corresponding fault detection processes, so that the fault type can be further refined. Moreover, accurate and reliable fault analysis is performed with reference to data in different states, and a fault type and a fault source can be quickly and accurately positioned, so that maintenance personnel perform fault maintenance quickly and safely, thereby reducing the costs of maintenance and detection, and effectively improving the efficiency and accuracy of fault detection.

It should be understood that the foregoing general description and the following detailed description are merely for illustration and explanatory purposes, and are not intended to limit the present disclosure.

BRIEF DESCRIPTION OF THE DRAWINGS

The accompanying drawings, which are incorporated herein and form a part of the specification, illustrate embodiments in accordance with the present invention, and together with the specification, serve to explain the principles of the present invention.

The accompanying drawings, which are incorporated herein and form a part of the specification, illustrate embodiments in accordance with the present disclosure, and together with the specification, serve to explain the principles of the present invention.

DETAILED DESCRIPTION

Exemplary embodiments are described in detail herein, and the embodiments are illustratively shown in the accompanying drawings. When the following descriptions relate to the accompanying drawings, unless otherwise indicated, same numbers in different accompanying drawings represent same or similar elements. Implementations described in the following example embodiments do not represent all implementations consistent with the present disclosure. On the contrary, the implementations are merely examples of fault detection apparatuses and methods that are described in the appended claims in detail and that are consistent with some aspects of the present disclosure.

Figure 1A:
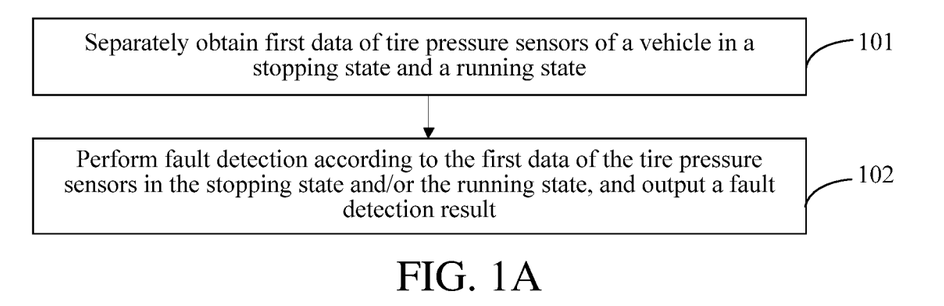
FIG. 1A to FIG. 1C are flowcharts of a fault detection method according to an exemplary embodiment.

FIG. 1A is a flowchart of a fault detection method according to an exemplary embodiment. As shown in FIG. 1A, an example in which the fault detection method is applied to a fault detection apparatus is used for description in this embodiment. The fault detection method may include the following steps:

In step 101, first data of tire pressure sensors of a vehicle in a stopping state and a running state is obtained.

In step 102, fault detection is performed according to the first data of the tire pressure sensors in the stopping state and/or the running state, and a fault detection result is output.

In actual application, the fault detection apparatus may be program code software, or may be a medium storing related executable code, for example, a USB flash disk. Alternatively, the fault detection apparatus may be an entity apparatus integrated or installed with related executable code, for example, a microcontroller unit (MCU), or an on-board computer.

An example is used for description with reference to an actual scenario. In actual application, according to a type of the fault detected currently, corresponding data may be selectively obtained to perform fault detection, or a plurality of types of data may be obtained, and fault detection is performed sequentially according to the data and analysis processes corresponding to the fault types. Based on the solution, the first data of the tire pressure sensors in the stopping state and the running state of the vehicle is first obtained; fault detection is subsequently performed according to the first data of the tire pressure sensors in the stopping state and/or the running state, and the fault detection result is finally output. Optionally, communication interaction in the solution may be implemented in a manner of wireless communication, for example, a communication manner of radio frequency (RF), which is commonly known as high frequency or low frequency.

The stopping state is a state in which tires of a vehicle do not rotate, and correspondingly, the vehicle possibly does not move currently. The running state is a state in which tires of a vehicle rotate, and correspondingly, the vehicle possibly moves currently.

A data type of the first data described herein may be set in advance. Specifically, the apparatus may collect statistics about data types required by various types of fault detection, for example, identifiers of the tire pressure sensors, and preconfigure the data types. Subsequently, various types of data may be uniformly obtained when the data is obtained, and then corresponding data selected from the obtained data is sequentially analyzed for different fault types. Alternatively, the data of the corresponding data type may be obtained in real time for different fault types, to perform detection. Specifically, the data type of the first data in the fault detection process in the solution may be determined according to the type of fault needing to be detected. For the data required by various fault types, reference may be made to the subsequent content in the solution.

The first data may be obtained in a plurality of manners. The first data being obtained in the stopping state is used as an example. Based on any implementation, the obtaining first data of tire pressure sensors in a stopping state of a vehicle in 101 may specifically include:

sending a trigger signal to the tire pressure sensors when the vehicle is in the stopping state; and receiving the first data of the tire pressure sensors in the stopping state returned by the tire pressure sensors according to the trigger signal.

An example is used for description with reference to an actual scenario. Currently, most tire pressure sensors are triggered by using low frequency. Therefore, the manner of low-frequency trigger is used as an example in this embodiment. Specifically, the process of obtaining the first data in the stopping state includes: When the vehicle is in the stopping state, the low-frequency signal may be used for triggering the tire pressure sensors disposed in the tires, that is, the trigger signal is sent to the tire pressure sensors, and the tire pressure sensors may return data according to the received trigger signal, so that the first data of the tire pressure sensors in the stopping state is obtained, for example, at least one of the identifiers of the tire pressure sensors, tire pressures output by the tire pressure sensors, temperature in the tires where the tire pressure sensors are located, electricity quantities of the tire pressure sensors, tire states output by the tire pressure sensors, protocol features of interaction protocols supported by the tire pressure sensors, and left-tire and right-tire information of the tires where the tire pressure sensors are located in the running state. The tire state may further indicate a current state of the vehicle, for example, a stopping state, a running state, and an air leakage state. In actual application, different tire states may be represented by using different status words, to reduce a data processing amount and complex degree.

Optionally, after the first data of the tire pressure sensors in the stopping state is obtained, the data may further be displayed to a user, for example, displayed by using a display module. Still optionally, the data may further be stored, to facilitate the subsequent fault detection. In actual application, the tire pressure sensor may be triggered by using a low frequency trigger diagnostic device, to obtain the first data in the stopping state.

The first data being obtained in the running state is used as an example. Based on any implementation, the obtaining first data of tire pressure sensors in a running state of a vehicle in 101 may specifically include:

receiving high-frequency signals sent by the tire pressure sensors when the vehicle is in the running state; and parsing the high-frequency signals to obtain the first data of the tire pressure sensors in the running state.

An actual scenario is still used as an example for description. Currently, signals of most tire pressure sensors are output in a form of high-frequency signals. Therefore, the manner of outputting the high-frequency signal is used as an example in this embodiment. Specifically, the process of obtaining the first data in the running state includes: When the vehicle is in the running state, the high frequency signal sent by the tire pressure sensor may be received, and the high frequency signal is parsed to obtain the first data in the running state.

Figure 1B:
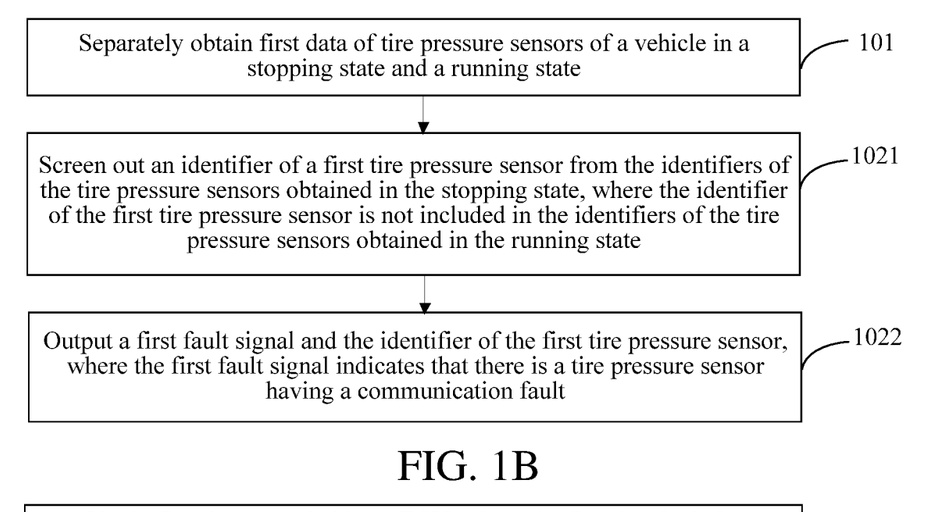

Based on the data obtained by using the solution, in a feasible embodiment, fault detection may be performed on a communication function of the tire pressure sensors. Correspondingly, as shown in FIG. 1B, FIG. 1B is a flowchart of a fault detection method according to another exemplary embodiment. Based on any implementation, the first data includes identifiers of the tire pressure sensors; and correspondingly, step 102 may specifically include:

Step 1021. Screen out an identifier of a first tire pressure sensor from the identifiers of the tire pressure sensors obtained in the stopping state, where the identifier of the first tire pressure sensor is not included in the identifiers of the tire pressure sensors obtained in the running state.

Step 1022. Output a first fault signal and the identifier of the first tire pressure sensor, where the first fault signal indicates that there is a tire pressure sensor having a communication fault in the running state.

An example is used for description with reference to an actual scenario. The identifiers of the tire pressure sensors are first obtained in the stopping state and the running state separately, and screening is performed to obtain, from the identifiers of the tire pressure sensors in the stopping state, the tire pressure sensor whose identifier does not belong to the corresponding identifiers in the running state. It may be understood that, assuming that the communication function of the tire pressure sensors is normal both in the stopping state and the running state, the identifiers of the tire pressure sensors obtained in the stopping state and the running state should be the same. If the identifiers are the same, it indicates that the tire pressure sensors do not have a communication fault. However, due to less impact, the communication function of the tire pressure sensors in the stopping state is generally better than that in the running state. The communication function of the tire pressure sensors in the running state may be affected. Therefore, the identifiers of the tire pressure sensors obtained in the stopping state and the running state are compared in this implementation. Statistics about identifiers of tire pressure sensors that exist in the stopping state and do not exist in the running state are collected. It indicates that the communication function of the tire pressure sensors has a fault in the running state, thereby quickly and accurately determining the current fault type and the fault source.

In actual application, first fault information and the following fault information may be indicated in a plurality of manners. For example, LED lights corresponding to different fault types are preconfigured, and correspondingly, when the first fault information is output, an LED light corresponding to the first fault information lights up. Or more conveniently, the fault information may be indicated by using different characters. For example, the FIG. 1 may indicate the first fault information. When a screen displays the FIG. 1, the user can learn, according to the figure, which type of fault currently occurs. The manner of outputting the fault information is not limited in this embodiment.

In this implementation, based on the identifiers of the tire pressure sensors obtained in the stopping state and the running state, it is analyzed quickly and accurately whether there is a tire pressure sensor having a communication fault, and the tire pressure sensor having the communication fault is positioned. Subsequently, the maintenance personnel may quickly and conveniently implement fault maintenance by replacing the tire pressure sensor having the fault.

In addition, based on the solution, fault detection may further be performed on identifier setting of the tire pressure sensors. Optionally, based on any implementation, the first data includes identifiers of the tire pressure sensors; and correspondingly, step 102 may specifically include:

detecting whether same identifiers exist in the identifiers of the tire pressure sensors in the stopping state; and outputting a second fault signal if the same identifiers exist, where the second fault signal indicates that there is a tire pressure sensor whose identifier is incorrectly set.

An example is used for description with reference to an actual scenario. In this implementation, after the identifiers of the tire pressure sensors are obtained, it is detected whether same sensor identifiers exist. The sensor identifier is used for uniquely identifying a tire pressure sensor. Therefore, in a normal case, the identifiers of the tire pressure sensors should be different. If the same identifiers exist, it indicates that the identifier setting of the tire pressure sensors has an error. Further, a corresponding fault signal is output. Specifically, in this implementation, detection performed on the identifier setting does not depend on specific data collected in the running state. Optionally, detection may be performed based on data obtained in the stopping state. It may be understood that, because the data obtaining in the stopping state is not affected by factors in the running state, the data that can be obtained may be more comprehensive, thereby increasing the accuracy of fault detection. Moreover, in this solution, other implementations in which fault detection is performed by using the data in the stopping state all have the foregoing beneficial effects.

In this implementation, based on the obtained identifiers of the tire pressure sensors, it is analyzed quickly and accurately whether there is a tire pressure sensor whose identifier incorrectly set. Subsequently, the maintenance personnel may implement fault maintenance by changing the identifier setting.

Figure 1C:
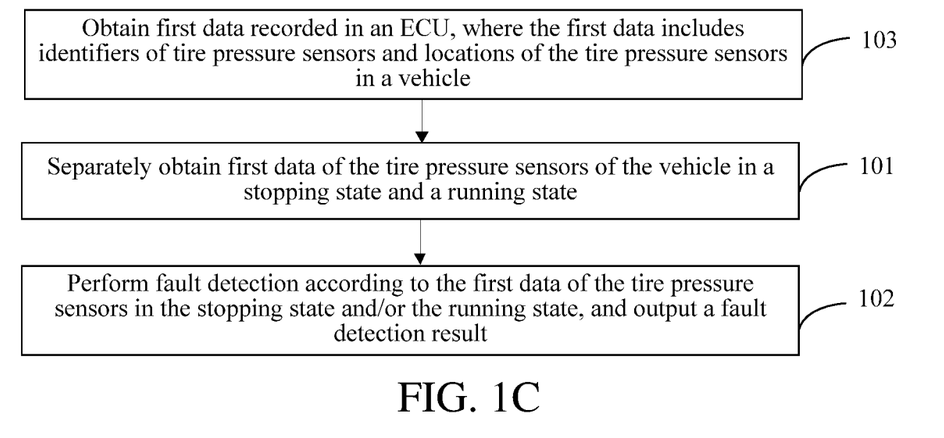

Based on the data obtained in this solution, in another feasible implementation, in addition to the fault detection performed based on the obtained first data, diversified fault detection may further be performed according to electronic control unit (ECU for short, and also referred to as a "trip-computer", a "vehicle-mounted computer", or the like) data. Optionally, as shown in FIG. 1C, FIG. 1C is a flowchart of a fault detection method according to another exemplary embodiment. Based on any implementation, the method may further include:

Step 103. Obtain the first data recorded in the ECU, where the first data includes identifiers of the tire pressure sensors and locations of the tire pressure sensors in the vehicle.

An example is used for description with reference to an actual scenario. In actual application, after being mounted in a tire, the tire pressure sensor may actively perform sensor learning after a specified period of time or passively perform sensor learning when triggered by an ECU instruction, to obtain some related data and report the data to the ECU. The data can also reflect whether a fault occurs currently, for use in fault detection. In this implementation, in addition to obtaining the first data in the stopping state and the running state, the first data recorded in the ECU is also obtained.

It may be understood that, the first data recorded in the ECU is reported to the ECU by a tire pressure sensor that has performed learning. Therefore, the data reported by the tire pressure sensor has higher accuracy to some extent. Optionally, based on the implementation shown in FIG. 1C and any implementation in FIG. 1C, the method may further include:

comparing data of a same data type in the first data in the stopping state and the first data recorded in the ECU; and outputting an exception signal and the data if inconsistent data exists.

Figure 1D:
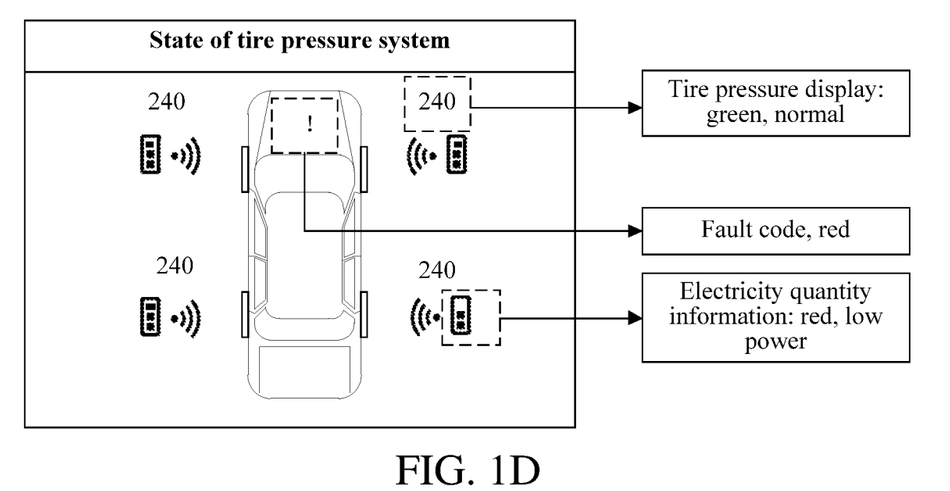
FIG. 1D is an interface display diagram of a tire pressure state result.

An example is used for description with reference to an actual scenario. After the first data of the tire pressure sensors in the stopping state and the first data, which is reported by the tire pressure sensor that has performed learning and recorded in the ECU, are obtained, the two pieces of the first data are compared, and the specific comparing process is comparing data corresponding to each data type. For example, for tire pressures output by the tire pressure sensors, the tire pressure output by each tire pressure sensor in the stopping state is compared with the tire pressure output by each tire pressure sensor that has performed learning and recorded in the ECU. If the tire pressures are consistent, the consistent tire pressures have high accuracy, and if not, it indicates that data of the two tire pressures does not match. Further, the inconsistent data may be output to instruct the user to perform further fault detection and maintenance. In actual application, there may also be a plurality of manners of outputting the exception signal. For example, an identifier corresponding to the data type of the inconsistent data is displayed in red, indicating that the data is abnormal. An identifier corresponding to the data type of inconsistent data is displayed in green, indicating that the data is normal. Further, the inconsistent data may be output in an integrated form, for example, in a form of a table, achieving an effect of determining abnormal data more intuitively and accurately. For example, as shown in FIG. 1D, FIG. 1D is an interface display diagram of a tire pressure state result.

In actual application, there may be a plurality of manners of obtaining data from the ECU. For example, the data may be obtained through interaction between on-board diagnostics (OBD) and the ECU. Correspondingly, an OBD communication module may be disposed in the apparatus in the solution, and the OBD communication module is mainly responsible for being connected to a vehicle OBD connector, and performing bus interaction with the ECU. In addition, for example, the data obtained from the ECU may include but not limited to: the identifiers of the tire pressure sensors, the tire pressures output by the tire pressure sensors, an OBD fault code, and the like.

In this implementation, based on the data obtained in the stopping state and the related data recorded in the ECU, it is analyzed quickly and accurately whether there is a fault, thereby improving the diversity of fault detection.

Figure 1E:
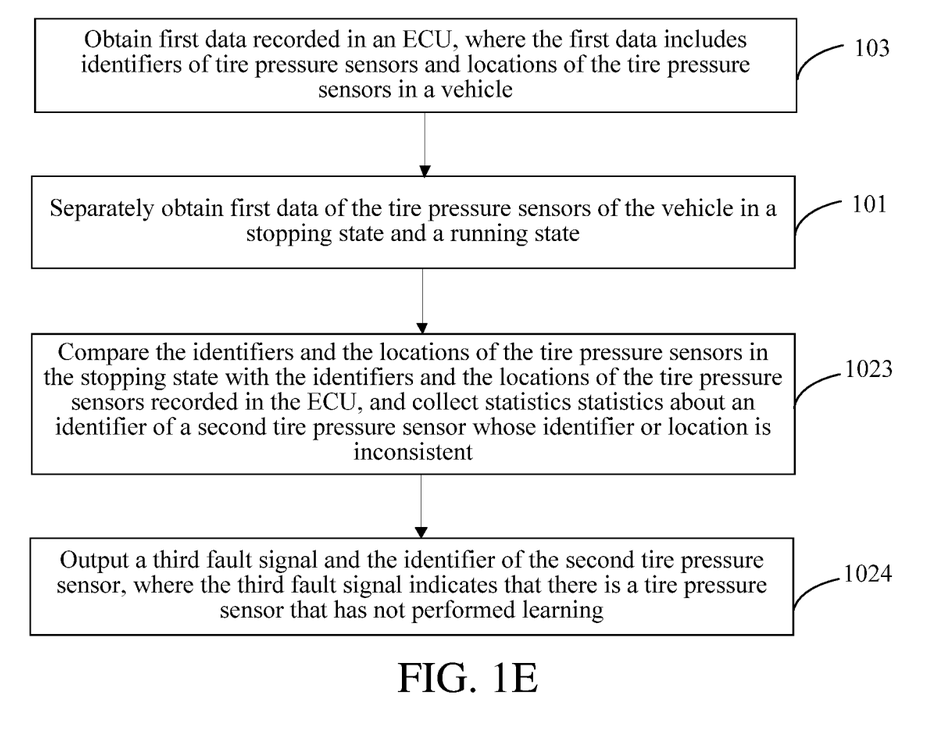
FIG. 1E to FIG. 1I are flowcharts of a fault detection method according to an exemplary embodiment.

In addition, the data recorded in the ECU is reported to the ECU by the learned tire pressure sensors that have performed learning. Therefore, learning states of the tire pressure sensors can be reflected to some extent. Optionally, as shown in FIG. 1E, FIG. 1E is a flowchart of a fault detection method according to still another exemplary embodiment. Based on the implementation shown in FIG. 1C and any implementation in FIG. 1C, step 102 may specifically include:

Step 1023: Compare the identifiers and the locations of the tire pressure sensors in the stopping state with the identifiers and the locations of the tire pressure sensors recorded in the ECU, and collect statistics about an identifier of a second tire pressure sensor whose identifier or location is inconsistent.

Step 1024: Output a third fault signal and the identifier of the second tire pressure sensor, where the third fault signal indicates that there is a tire pressure sensor that has not performed learning.

An example is used for description with reference to an actual scenario. In actual application, the following situation may exist: A tire pressure sensor reports related information to the ECU after being mounted in the tire and learning, and then, the tire pressure sensor may be replaced. However, the newly mounted tire pressure sensor may not perform the sensor learning yet. In this stage, the actually obtained sensor identifier or the sensor location may be different from the sensor identifier or the sensor location recorded in the ECU, and the situation indicates that currently, there is a sensor which has not performed learning. Specifically, in this implementation, after the identifiers and the locations of the tire pressure sensors in the stopping state and the sensor identifiers and locations, which are reported by the tire pressure sensors that have performed learning and recorded in the ECU, are obtained, the identifiers and locations are compared. If the identifiers or the locations are inconsistent, it indicates that there is a tire pressure sensor that has not performed learning, and further, a corresponding fault signal and an identifier of the tire pressure sensor that has not performed learning are output.

In this implementation, by comparing the identifiers and the locations of the tire pressure sensors obtained in the stopping state with the sensor identifiers and locations recorded in the ECU, it is analyzed quickly and accurately whether there is a tire pressure sensor that has not performed learning, and the tire pressure sensor is positioned. Subsequently, the maintenance personnel may implement fault maintenance by instructing the tire pressure sensor to perform sensor learning.

In actual application, different vehicle manufacturers adopt different communications technologies. Therefore, different vehicles support different interaction protocols. The interaction protocol depends, to some extent, on a preconfigured interaction protocol between the ECU and the tire pressure sensor of the vehicle for different vehicles.

Figure 1F:
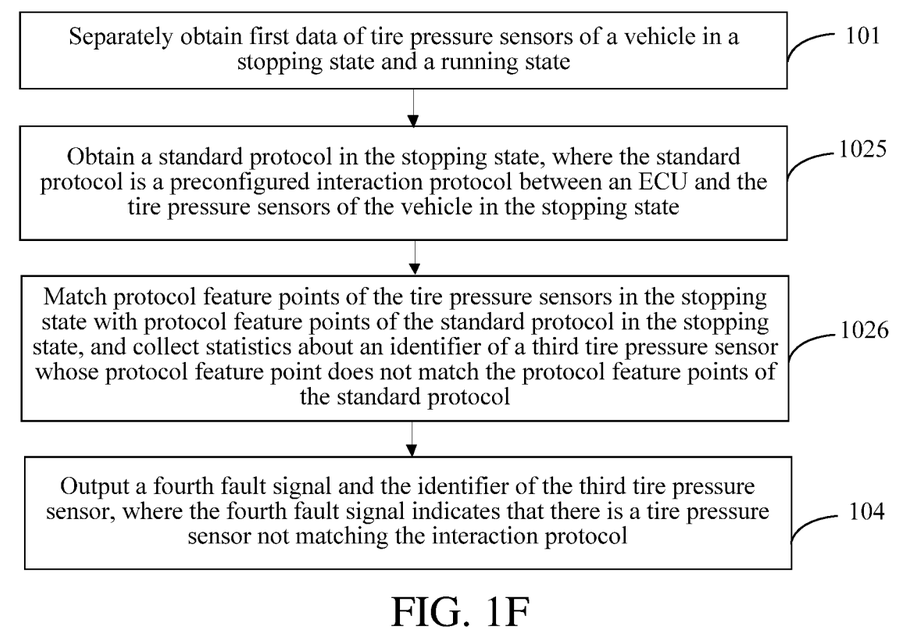

Optionally, to perform fault detection on an interaction function, as shown in FIG. 1F, which is a flowchart of a fault detection method according to yet another exemplary embodiment, based on any implementation, the first data includes identifiers and protocol feature points of the tire pressure sensors; and correspondingly, step 102 may specifically include:

Step 1025. Obtain a standard protocol in the stopping state, where the standard protocol is a preconfigured interaction protocol between an ECU and the tire pressure sensors of the vehicle in the stopping state.

Step 1026. Match the protocol feature points of the tire pressure sensors in the stopping state with protocol feature points of the standard protocol in the stopping state, and collect statistics about an identifier of a third tire pressure sensor whose protocol feature point does not match the protocol feature points of the standard protocol.

An example is used for description with reference to an actual scenario. In this implementation, after the protocol feature points of the tire pressure sensors are obtained, the protocol feature points of the tire pressure sensors in the stopping state are matched with the protocol feature points of the standard protocol in the stopping state; if the matching succeeds, it indicates that the interaction protocol of the tire pressure sensors in the stopping state matches the interaction protocol of the vehicle; otherwise, a fault of interaction protocol mismatching exists in the stopping state.

Figure 1G:
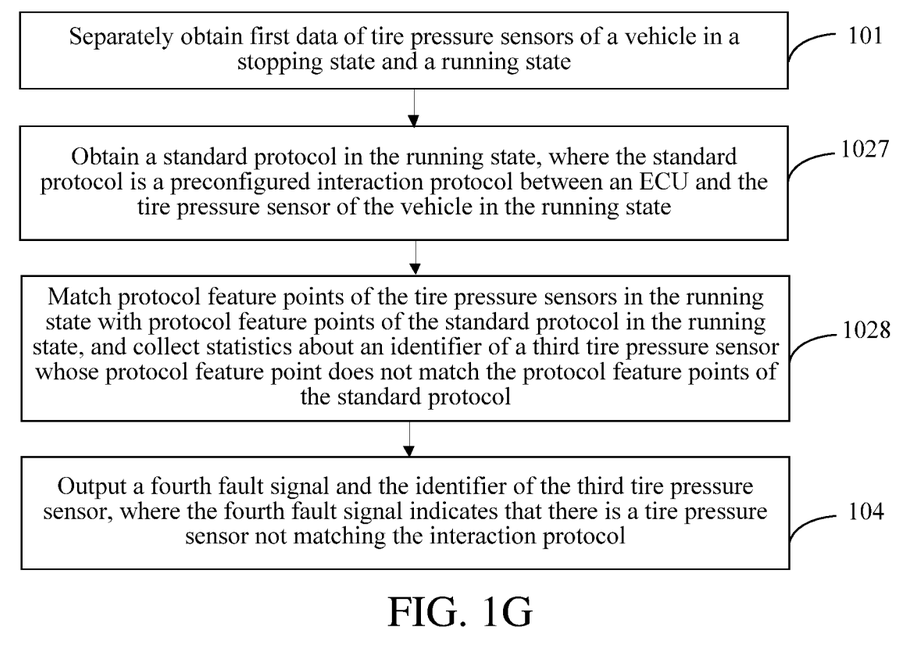

In the foregoing implementation, detection is performed on the interaction protocol in the stopping state. In actual application, standard protocols in different states are different, and therefore, in another feasible implementation, detection may be further performed on the interaction protocol in the running state. Correspondingly, as shown in FIG. 1, based on any implementation, the first data includes identifiers and protocol feature points of the tire pressure sensors; and correspondingly, step 102 may specifically include:

Step 1027. Obtain a standard protocol in the running state, where the standard protocol is a preconfigured interaction protocol between an ECU and the tire pressure sensors of the vehicle in the running state.

Step 1028. Match the protocol feature points of the tire pressure sensors in the running state with protocol feature points of the standard protocol in the running state, and collect statistics about an identifier of a third tire pressure sensor whose protocol feature point does not match the protocol feature points of the standard protocol.

An example is used for description with reference to an actual scenario. In this implementation, after the protocol feature points of the tire pressure sensors are obtained, the protocol feature points of the tire pressure sensors in the running state are matched with the protocol feature points of the standard protocol in the running state; if the matching succeeds, it indicates that the interaction protocol of the tire pressure sensors in the running state matches the interaction protocol of the vehicle; otherwise, a fault of interaction protocol mismatching exists in the running state.

The foregoing two implementations of detecting the interaction protocol may be implemented alone or together. Further, when it is detected that the interaction protocols do not match with each other, the corresponding fault signal and the identifier of the tire pressure sensor whose protocol feature point does not match the protocol feature points of the standard protocol are output. Correspondingly, based on the foregoing two implementations, or based on either of the foregoing two implementations, the method further includes:

Step 104. Output a fourth fault signal and the identifier of the third tire pressure sensor, where the fourth fault signal indicates that there is a tire pressure sensor not matching the interaction protocol.

Further optionally, the first data may further include locations of the tire pressure sensors, that is, the locations of the tires where the tire pressure sensors are located, so that the maintenance personnel may determine a faulty sensor more quickly and perform maintenance.

In the foregoing implementation, based on matching performed between the protocol feature points of the tire pressure sensors and the standard protocol, it is analyzed quickly and accurately whether there is a tire pressure sensor not matching the interaction protocol, and the tire pressure sensor is positioned. Subsequently, the maintenance personnel may implement fault maintenance by replacing the tire pressure sensor with a supported tire pressure sensor that matches the interaction protocol.

In actual application, there may be various methods for determining the standard protocol. In a feasible implementation, step 1025 may specifically include: determining the standard protocol in the stopping state according to a model of the vehicle and/or a model of the tire pressure sensor. Similarly, in a feasible implementation, step 1027 may specifically include: determining the standard protocol in the running state according to the model of the vehicle and/or the model of the tire pressure sensor.

Specifically, in this implementation, statistics about configured interaction protocols of different vehicles in different states may be collected in advance. Based on different vehicles, corresponding interaction protocols may be associated with the vehicles, and an association relationship between the identifiers of the vehicles and the interaction protocols are pre-established and updated and maintained. The identifier of the vehicle may include a model of the vehicle, for example, series to which the vehicle belongs, a vehicle type, a year of production, and the like. Alternatively, the identifier of the vehicle may include a model of a hardware device of the vehicle, such as a part number of the tire pressure sensor, or a model of the ECU. Subsequently, after protocol parameters of the vehicle on which fault detection is currently performed, based on the identifier of the vehicle and a state in which detection needs to be performed, such as the stopping state and/or the running state, a corresponding standard protocol may be determined according to the association relationship.

In this implementation, by pre-establishing and maintaining an association relationship between vehicles and interaction protocols, a corresponding standard protocol can be determined quickly and conveniently after an identifier of a vehicle is obtained subsequently.

In actual application, the process of obtaining the standard protocol may be triggered and performed in a certain manner. For example, a switch button is disposed, and when the user presses the switch button, the process of obtaining the standard protocol is performed.

Figure 1H:
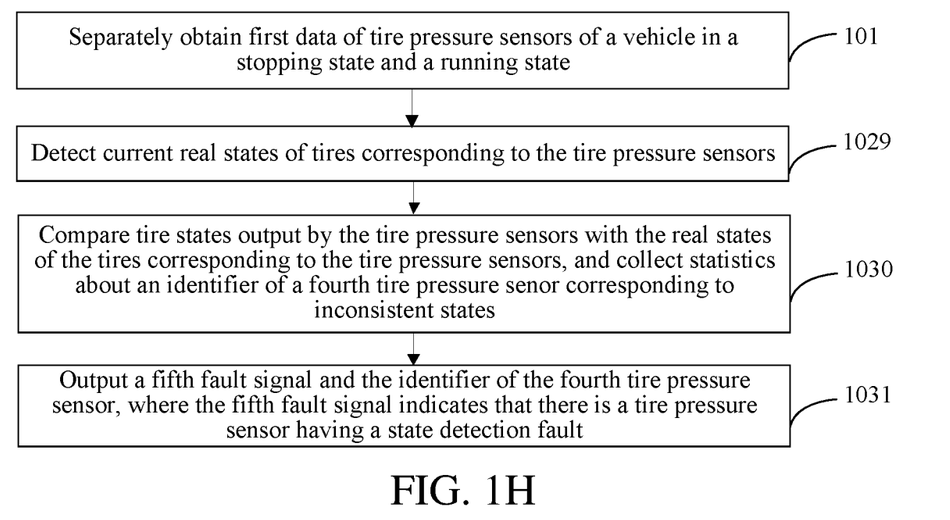

In addition, based on the solution, fault detection may further be performed on a tire state detection function. Optionally, as shown in FIG. 1H, FIG. 1H is a flowchart of a fault detection method according to still another exemplary embodiment. Based on any implementation, the first data includes identifiers of the tire pressure sensors and tire states output by the tire pressure sensors; and correspondingly, step 102 may specifically include:

Step 1029. Detect current actual states of tires corresponding to the tire pressure sensors.

Step 1030. Compare the tire states output by the tire pressure sensors with the actual states of the tires corresponding to the tire pressure sensors, and collect statistics about an identifier of a fourth tire pressure sensor corresponding to inconsistent states.

Step 1031. Output a fifth fault signal and the identifier of the fourth tire pressure sensor, where the fifth fault signal indicates that there is a tire pressure sensor having a state detection fault.

An example is used for description with reference to an actual scenario. In this implementation, for a case that the tire state detected by the tire pressure sensor may be inaccurate, the actual state of the current tire may be obtained in real time in another manner. Specifically, for the obtaining method, reference may be made to the current solution of obtaining the tire state. After the actual tire state is obtained, the tire state output by the tire pressure sensor is compared with the actual state of the tire. If the states are consistent, it indicates that the tire state output by the tire pressure sensor is accurate; otherwise, it indicates that the tire state output by the tire pressure sensor is inaccurate, and further, a corresponding fault signal and the identifier of the tire pressure sensor that outputs the inaccurate tire state are output.

In this implementation, by comparing the tire states output by the tire pressure sensors with the obtained actual states of the tires, it is analyzed quickly and accurately whether there is a tire pressure sensor of which the tire state detection is inaccurate, and the tire pressure sensor is positioned. Subsequently, the maintenance personnel may implement fault maintenance by updating tire state setting of the tire pressure sensors.

Figure 1I:
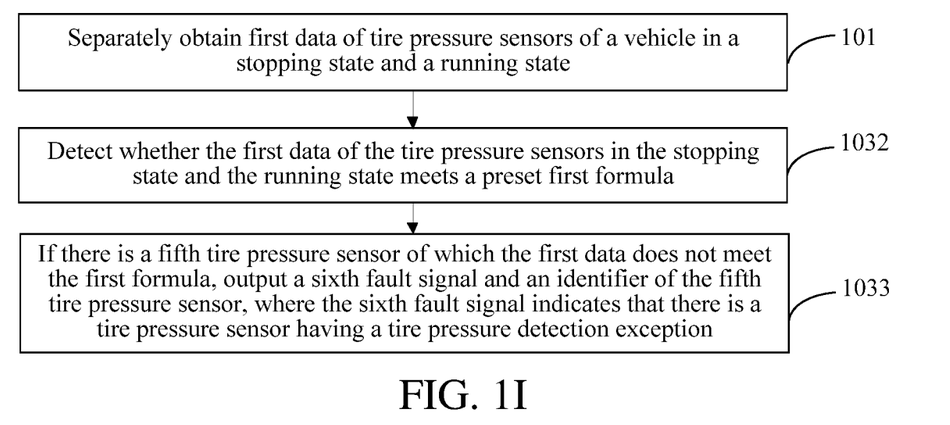

In still another feasible implementation, based on the solution, fault detection may further be performed on a tire pressure detection function. Optionally, as shown in FIG. 1I, FIG. 1I is a flowchart of a fault detection method according to still another exemplary embodiment. Based on any implementation, the first data includes identifiers of the tire pressure sensors, temperature of tires where the tire pressure sensors are located, and tire pressures output by the tire pressure sensors; and correspondingly, step 102 may specifically include:

Step 1032. Detect whether the first data of each tire pressure sensor in the stopping state and the running state meets a preset first formula, where the first formula is as follows:

$$P3=P1+(T3-T1)*1+\Delta P,$$

where P3 is a tire pressure output by the tire pressure sensor in the running state, P1 is a tire pressure output by the tire pressure sensor in the stopping state, T3 is a temperature in the tire where the tire pressure sensor is located in the running state, T1 is a temperature in the tire where the tire pressure sensor is located in the stopping state, and ΔP is a preset error.

Step 1033. If there is a fifth tire pressure sensor that does not meet the first formula, output a sixth fault signal and the identifier of the fifth tire pressure sensor, where the sixth fault signal indicates that there is a tire pressure sensor having a tire pressure detection exception.

An example is used for description with reference to an actual scenario. In actual application, due to the influence of the temperature, when the vehicle is in the running state, for every increment of the temperature in the tire, for example, an increment of 1° C., the tire pressure in the tire may be increased correspondingly, for example, increased by about 1 Kpa. In this implementation, after the identifiers of the tire pressure sensor, the temperatures of the tire where the tire pressure sensor is located, and the output tire pressures in the stopping state and the running state are obtained, it is determined whether the data meets the formula by substituting the data into the formula for representing the rule and performing computing, that is, it is determined whether the data meets a normal rule, and it is determined whether the tire pressure output by the tire pressure sensor is accurate. Specifically, if the data meets the formula, it indicates that the tire pressure output by the tire pressure sensor is accurate; otherwise, it indicates that the tire pressure output by the tire pressure sensor is inaccurate, and further, a corresponding fault signal and the identifier of the tire pressure sensor that outputs the inaccurate pressure are output.

In addition, an effective error range ΔP is introduced into the implementation to further improve the accuracy of fault detection. Specifically, ΔP may be determined according to experience or data analysis. For example, ΔP may be set to ±10 Kpa.

In this implementation, based on the tire pressures output by the tire pressure sensors obtained in the stopping state and the running state with reference to the rule formula, it is analyzed quickly and accurately whether there is a tire pressure sensor of which the tire pressure detection is inaccurate, and the tire pressure sensor is positioned. Subsequently, the maintenance personnel may implement fault maintenance by replacing the tire pressure sensor.

Further, based on the foregoing implementation, to further improve the diversity and accuracy of the fault detection, based on the implementation shown in FIG. 1I, the method may further include:

obtaining an on-board diagnostics (OBD) diagnosis result if the first data of the tire pressure sensor meets the first formula and the tire pressure output by the tire pressure sensor in the stopping state meets a current tire pressure reference value, where the OBD diagnosis result includes an OBD fault code; and outputting a seventh fault signal if a fault code indicating a tire pressure exception exists in the OBD fault code, where the seventh fault signal is used for indicating that the current tire pressure reference value is incorrect.

An example is used for description with reference to an actual scenario. The accuracy of the tire pressure detection result is also affected by the tire pressure reference value in addition to the detection performance of the tire pressure sensor itself. In this implementation, after it is determined that the tire pressure output by the tire pressure sensor is accurate, and it is determined that the current tire pressure is normal based on the tire pressure output by the tire pressure sensor with reference to the current tire pressure reference value, the OBD fault code is obtained. It is detected whether the OBD fault code includes a fault code representing an abnormal tire pressure, and if there is a fault code, it indicates that the current tire pressure reference value is abnormal. For example, it is assumed that an upper limit value of a normal tire pressure is 1.5 Kpa, and the currently obtained tire pressure output by the tire pressure sensor is 2 Kpa and the tire pressure conforms to the real tire pressure. In this case, a normal tire pressure detection result should be an excessively high tire pressure and an exception prompt is provided. It is assumed that the upper limit value of the current tire pressure reference value is incorrectly set to 2 Kpa. In this case, an incorrect detection result that the current tire pressure is normal may be obtained. In this implementation, a recheck is further performed with reference to the OBD detection result. Specifically, still with reference to the foregoing example, the tire pressure detection result of the OBD does not rely on the tire pressure reference value set by the tire pressure sensor. Therefore, assuming that in the obtained OBD fault code, there is a fault code representing abnormal tire pressure, it may be determined that the tire pressure reference value set for the current tire pressure sensor is incorrect.

In this implementation, the tire pressure detection result is obtained based on the tire pressures output by the tire pressure sensors, and with reference to the fault code representing a tire pressure exception in the OBD fault code, it is analyzed accurately and reliably whether there is a tire pressure sensor of which the tire pressure reference value is incorrect, and the tire pressure sensor is positioned. Subsequently, the maintenance personnel may implement fault maintenance by resetting the tire pressure reference value of the tire pressure sensor.

Optionally, in still another feasible implementation, based on the solution, fault detection may further be performed on a positioning function of the tire pressure sensors. Optionally, based on any implementation, the first data includes location information of tires where the tire pressure sensors are located in the running state; and correspondingly, step 102 may specifically include:

counting tire pressure sensors located in left tires and tire pressure sensors located in right tires according to the location information of the tires where the tire pressure sensors are located in the running state; and outputting an eighth fault signal if the quantity of the tire pressure sensors located in the left tires is different from the quantity of the tire pressure sensors located in the right tires, where the eighth fault signal indicates that there is a tire pressure sensor having a positioning fault.

An example is used for description with reference to an actual scenario. In this implementation, after the location information of the tires where the tire pressure sensors are located in the running state, the quantity of the tire pressure sensors in the left tires and the quantity of the tire pressure sensors in the right tires are counted. In a normal situation, the two quantities should be consistent, and if the quantities are inconsistent, it indicates that an error occurs in the positioning result of the tire pressure sensors. Further, a corresponding fault signal and an identifier of an incorrectly positioned tire pressure sensor are output. In actual application, for an ordinary vehicle, the following equation should be met: the quantity of tire pressure sensors in left tires=the quantity of tire pressure sensors in right tires=2.

In this implementation, based on the positioning data output by the tire pressure sensors obtained in the running state, it is analyzed quickly and accurately whether there is a tire pressure sensor positioned inaccurately, and the tire pressure sensor is positioned. Subsequently, the maintenance personnel may implement fault maintenance by instructing the tire pressure sensor to perform learning again.

In addition, based on the solution, fault detection may further be performed on electricity quantities of the tire pressure sensors. Optionally, based on any implementation, the first data includes identifiers of the tire pressure sensors and electricity quantities of the tire pressure sensors; and correspondingly, step 102 may specifically include:

if it is detected that among the tire pressure sensors, there is a sixth tire pressure sensor of which the electricity quantity is less than a preset electricity quantity threshold in the stopping state or the running state, outputting a ninth fault signal and an identifier of the sixth tire pressure sensor, where the ninth fault signal indicates that there is a tire pressure sensor of which the electricity quantity is insufficient.

An example is used for description with reference to an actual scenario. In actual application, to implement tire monitoring as well in a process in which the vehicle is not started, the tire pressure sensor is usually configured with a battery for supplying power for the tire pressure sensor. In this implementation, after the electricity quantities of the tire pressure sensors in the stopping state and the running state are obtained, it is detected whether there is a tire pressure sensor having an excessively low electricity quantity in the stopping state or the running state, and if there is such a tire pressure sensor, a corresponding fault signal and the identifier of the tire pressure sensor having an excessively low electricity quantity are output. Specifically, the state of the electricity quantity may be determined based on the preset electricity quantity threshold. In addition, because the tire pressure sensors in the running state may be powered by another power supply installed in the vehicle, it cannot be comprehensively reflected whether the current electricity quantities of the sensors meet the requirement. In this implementation, the electricity quantities of the sensors in the stopping state and the running state are combined, and the solution in which a fault is detected as long as the electricity quantity is not in a normal range in one state further improves the accuracy and the reliability of the electricity quantity fault detection. Further, a location of the tire pressure sensor having an excessively low electricity quantity may further be output, and correspondingly, the first data further includes the locations of the tire pressure sensors.

In this implementation, based on the electricity quantity data output by the tire pressure sensors obtained in the stopping state or the running state, it is analyzed quickly and accurately whether there is a tire pressure sensor having an insufficient electricity quantity. Subsequently, the maintenance personnel may implement fault maintenance by replacing the tire pressure sensor.

In still another feasible implementation, based on the solution, fault detection may further be performed on whether there is a tire pressure sensor having interference. Optionally, based on any implementation, the first data includes identifiers of the tire pressure sensors and tire pressures output by the tire pressure sensors; and correspondingly, step 102 may specifically include:

if a plurality of pieces of tire pressure information output from a same tire pressure sensor identifier is received in the stopping state or the running state, outputting a tenth fault signal and an identifier of a seventh tire pressure sensor corresponding to the same identifier, where the plurality of pieces of tire pressure information includes a normal tire pressure and an abnormal tire pressure, and the tenth fault signal indicates that there is a tire pressure sensor having interference.

An example is used for description with reference to an actual scenario. In actual application, after learning of the tire pressure sensor fails or the tire pressure sensor is changed, some users may still place the replaced tire pressure sensor in the vehicle, and in this case, the tire pressure sensor may generate data interference, thereby affecting the accuracy of monitoring of the vehicle. To avoid the foregoing situation, in this implementation, according to the identifiers of the tire pressure sensors and the tire pressures output by the tire pressure sensors in the running process, if different tire pressures sent by the tire pressure sensor with the same identifier are received simultaneously in the running process. For example, a tire pressure indicating that the current tire pressure is normal output by a sensor is received, and simultaneously, another tire pressure indicating that the current tire pressure is abnormal (for example, the output is 0 Kpa) output by the sensor is also received, it indicates that currently, there is a sensor having interference. Further, before the foregoing detection is performed, the identifiers of the tire pressure sensors in the stopping state may be obtained. It is assumed that the identifiers are all different from each other, and the foregoing detection is then performed. In this way, a case that the identifier is incorrectly set may be further excluded.

In this implementation, based on the identifiers of the tire pressure sensors and the tire pressures output by the tire pressure sensors obtained in the stopping state or the running state, it is analyzed quickly and accurately whether there is an interfering tire pressure sensor. Subsequently, the maintenance personnel may implement fault maintenance by removing the interfering tire pressure sensor or instructing the tire pressure sensor to perform learning again.

On the whole, in the solution, a fault of a tire pressure system is detected by scanning and analyzing in real time data transmitted by the tire pressure sensors in the running state, with reference to the data in the stopping state and the OBD diagnosis result, and a fault detection report is formed to provide a maintenance basis and a maintenance solution, which greatly improves the efficiency and accuracy of the detection, greatly reduces the time it takes for the maintenance personnel to position and resolve the TPMS fault, and reduces the costs of maintenance. It should be noted that the implementations in the solution can be implemented alone or together, and this is not limited in this embodiment.

According to the fault detection method provided in this embodiment, related data of tire pressure sensors is obtained when a vehicle is in a stopping state and a running state separately. According to the data obtained in the stopping state and the running state and a type of fault needing to be detected currently, detection is performed according to a corresponding fault detection process, a specific type of fault occurring currently is determined, and a fault source is accurately positioned. According to the solution, for different fault types, corresponding data is obtained, and detection is performed based on the corresponding fault detection process, so that the fault type can be further refined. Moreover, accurate and reliable fault analysis is performed with reference to data in different states, and a fault type and a fault source can be quickly and accurately positioned, so that maintenance personnel perform fault maintenance quickly and safely, thereby reducing the costs of maintenance and detection, and effectively improving the efficiency and accuracy of fault detection.

Figure 2A:
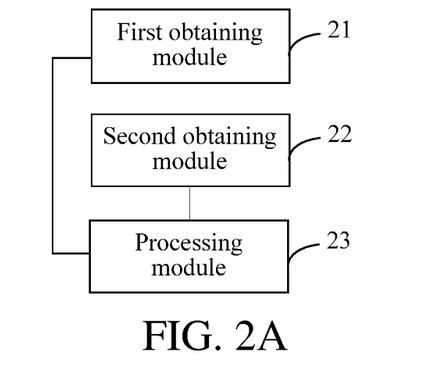
FIG. 2A to FIG. 2B are structural diagrams of a fault detection apparatus according to an exemplary embodiment.

FIG. 2A is a structural diagram of a fault detection apparatus according to an exemplary embodiment, and as shown in FIG. 2A, the fault detection apparatus may include:

a first obtaining module 21, configured to obtain first data of tire pressure sensors of a vehicle in a stopping state;

a second obtaining module 22, configured to obtain first data of the tire pressure sensors of the vehicle in a running state; and a processing module 23, configured to perform fault detection according to the first data of the tire pressure sensors in the stopping state and/or the running state, and output a fault detection result.

In actual application, the fault detection apparatus may be program code software, or may be a medium storing related executable code, for example, a USB flash disk. Alternatively, the fault detection apparatus may be an entity apparatus integrated or installed with related executable code, for example, an MCU, and an on-board computer.

An example is used for description with reference to an actual scenario. The first data of the tire pressure sensors in the stopping state and the running state of the vehicle is obtained by the first obtaining module 21 and the second obtaining module 22 respectively; fault detection is subsequently performed by the processing module 23 according to the first data of the tire pressure sensors in the stopping state and/or the running state, and the fault detection result is finally output. Herein, a data type of the first data may be set in advance.

There may be a plurality of manners of obtaining the first data by the first obtaining module 21 and the second obtaining module 22. A case that the first obtaining module 21 obtains the first data in the stopping state is used as an example. Based on any implementation, the first obtaining module 21 is specifically configured to send a trigger signal to the tire pressure sensors when the vehicle is in the stopping state; and the first obtaining module 21 is further specifically configured to receive the first data of the tire pressure sensors in the stopping state returned by the tire pressure sensors according to the trigger signal. Optionally, after the first obtaining module 21 obtains the first data of the tire pressure sensors in the stopping state, the data may further be displayed by using a display module. A case that the second obtaining module 22 obtains the first data in the running state is used as another example. Based on any implementation, the second obtaining module 22 is specifically configured to receive high-frequency signals sent by the tire pressure sensors when the vehicle is in the running state; and the second obtaining module 22 is further specifically configured to parse the high-frequency signals to obtain the first data of the tire pressure sensors in the running state. Similarly, optionally, after the second obtaining module 22 obtains the first data of the tire pressure sensors in the running state, the data may further be displayed by using a display module.

Based on the data obtained by using the solution, in a feasible embodiment, fault detection may be performed on a communication function of the tire pressure sensors. Correspondingly, based on any implementation, the first data includes identifiers of the tire pressure sensors. The processing module 23 is specifically configured to screen out an identifier of a first tire pressure sensor from the identifiers of the tire pressure sensors obtained in the stopping state, where the identifier of the first tire pressure sensor is not included in the identifiers of the tire pressure sensors obtained in the running state; and the processing module 23 is further specifically configured to output a first fault signal and the identifier of the first tire pressure sensor, where the first fault signal indicates that there is a tire pressure sensor having a communication fault in the running state.

In this implementation, based on the identifiers of the tire pressure sensors obtained in the stopping state and the running state, it is analyzed quickly and accurately whether there is a tire pressure sensor having a communication fault, and the tire pressure sensor having the communication fault is positioned. Subsequently, the maintenance personnel may quickly and conveniently implement fault maintenance by replacing the tire pressure sensor having the fault.

In addition, fault detection may further be performed on identifier setting of the tire pressure sensors. Optionally, based on any implementation, the first data includes identifiers of the tire pressure sensors. The processing module 23 is specifically configured to detect whether same identifiers exist in the identifiers of the tire pressure sensors in the stopping state; and the processing module 23 is further specifically configured to output a second fault signal if the same identifiers exist, where the second fault signal indicates that there is a tire pressure sensor whose identifier is incorrectly set.

In this implementation, based on the obtained identifiers of the tire pressure sensors, it is analyzed quickly and accurately whether there is a tire pressure sensor whose identifier is incorrectly set. Subsequently, the maintenance personnel may implement fault maintenance by changing the identifier setting.

Figure 2B:
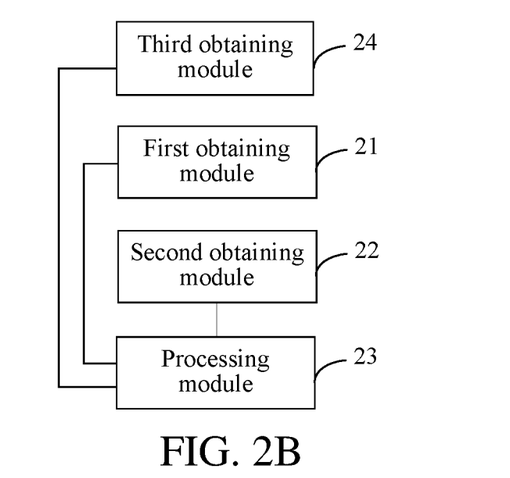

Based on the data obtained in this solution, in another feasible implementation, in addition to the fault detection based on the obtained first data, diversified fault detection may further be performed according to ECU data. Optionally, as shown in FIG. 2B, FIG. 2B is a structural diagram of a fault detection apparatus according to another exemplary embodiment. Based on any implementation, the apparatus may further include:

a third obtaining module 24, configured to obtain the first data recorded in an ECU, where the first data includes identifiers of the tire pressure sensors and locations of the tire pressure sensors in the vehicle.

Optionally, based on the implementation shown in FIG. 2B and any related implementation, the processing module 23 is further configured to compare data of a same data type in the first data in the stopping state and the first data recorded in the ECU, and the processing module 23 is further configured to: if there is inconsistent data, output an exception signal and the data. In this implementation, based on the data obtained in the stopping state and the related data recorded in the ECU, it is analyzed whether there is a fault exists, thus improving the diversity of fault detection.

In addition, the first data recorded in the ECU is reported to the ECU by tire pressure sensors that have performed learning. Therefore, learning states of the tire pressure sensors can be reflected to some extent. Optionally, based on the implementation shown in FIG. 2B and any related implementation, the processing module 23 is specifically configured to compare the identifiers and the locations of the tire pressure sensors in the stopping state with the identifiers and the locations of the tire pressure sensors recorded in the ECU, and collect statistics about an identifier of a second tire pressure sensor whose identifier or location is inconsistent; and the processing module 23 is further specifically configured to output a third fault signal and the identifier of the second tire pressure sensor, where the third fault signal represents that there is a tire pressure sensor that has not performed learning.

Optionally, to perform fault detection on an interaction function in the stopping state, based on any implementation, the first data includes identifiers and protocol feature points of the tire pressure sensors. The processing module 23 is specifically configured to obtain a standard protocol in the stopping state, where the standard protocol is a preconfigured interaction protocol between an ECU and the tire pressure sensors of the vehicle in the stopping state; and match the protocol feature points of the tire pressure sensors in the stopping state with protocol feature points of the standard protocol in the stopping state, and collect statistics about an identifier of a third tire pressure sensor whose protocol feature point does not match the protocol feature points of the standard protocol.

Optionally, to perform fault detection on an interaction function in the running state, based on any implementation, the first data includes identifiers and protocol feature points of the tire pressure sensors. The processing module 23 is specifically configured to obtain a standard protocol in the running state, where the standard protocol is a preconfigured interaction protocol between an ECU and the tire pressure sensors of the vehicle in the running state; and match the protocol feature points of the tire pressure sensors in the running state with protocol feature points of the standard protocol in the running state, and collect statistics about an identifier of a third tire pressure sensor whose protocol feature point does not match the protocol feature points of the standard protocol.

The foregoing implementations of detecting the interaction protocol may be implemented alone or together. Further, when it is detected that the interaction protocols do not match with each other, based on the foregoing two implementations, or based on either of the foregoing two implementations, the processing module 23 is further specifically configured to output a fourth fault signal and the identifier of the third tire pressure sensor, where the fourth fault signal indicates that there is a tire pressure sensor not matching the interaction protocol. In this implementation, based on matching performed between the protocol feature points of the tire pressure sensors and the standard protocol, it is analyzed quickly and accurately whether there is a tire pressure sensor not matching the interaction protocol, and the tire pressure sensor is positioned.

In actual application, there may be various methods for determining the standard protocol. Optionally, the processing module 23 is specifically configured to determine the standard protocol in the stopping state according to a model of the vehicle and/or a model of the tire pressure sensor. Optionally, the processing module 23 is specifically configured to determine the standard protocol in the running state according to the model of the vehicle and/or the model of the tire pressure sensor. In this implementation, by pre-establishing and maintaining an association relationship between vehicles and interaction protocols, a corresponding standard protocol can be determined quickly and conveniently after an identifier of a vehicle is obtained subsequently.

In actual application, the process of obtaining the standard protocol may be triggered and performed in a certain manner. For example, a switch button is disposed, and when a user presses the switch button, the process of obtaining the standard protocol is performed.

In addition, based on the solution, fault detection may further be performed on tire states. Optionally, based on any implementation, the first data includes identifiers of the tire pressure sensors and tire states output by the tire pressure sensors. Correspondingly, the processing module 23 is specifically configured to detect actual states of tires corresponding to tire pressure sensors currently, and the processing module 23 is further specifically configured to compare the tire state output by each tire pressure sensor and the actual state of the tire corresponding to the tire pressure sensor, and collect statistics about an identifier of a fourth tire pressure sensor corresponding to inconsistent tire states; the processing module 23 is further specifically configured to output a fifth fault signal and the identifier of the fourth tire pressure sensor, where the fifth fault signal represents that there is a tire pressure sensor having a state detection fault.

In this implementation, by comparing the tire states output by the tire pressure sensors with the obtained actual states of the tires, it is analyzed quickly and accurately whether there is a tire pressure sensor of which the tire state detection is inaccurate, and the tire pressure sensor is positioned.

In still another feasible implementation, based on the solution, fault detection may further be performed on a tire pressure detection function. Optionally, based on any implementation, the first data includes identifiers of the tire pressure sensors, temperatures of the tires where the tire pressure sensors are located, and tire pressures output by the tire pressure sensors. Correspondingly, the processing module 23 is specifically configured to detect whether the first data of each tire pressure sensor in the stopping state and the running state meets a preset first formula, where the first formula is $P3=P1+(T3-T1)*1+\Delta P$. P3 is tire pressure output by the tire pressure sensor in the running state, P1 is a tire pressure output by the tire pressure sensor in the stopping state, T3 is a temperature in the tire where the tire pressure sensor is located in the running state, T1 is a temperature in the tire where the tire pressure sensor is located in the stopping state, and $\Delta P$ is a preset error. The processing module 23 is further specifically configured to: if there is a fifth tire pressure sensor that does not meet the first formula, output a sixth fault signal and an identifier of the fifth tire pressure sensor, where the sixth fault signal represents that there is a tire pressure sensor having a tire pressure detection exception.

In this implementation, based on the tire pressures output by the tire pressure sensors obtained in the stopping state and the running state with reference to the rule formula, it is analyzed quickly and accurately whether there is a tire pressure sensor of which the tire pressure detection is inaccurate, and the tire pressure sensor is positioned. Subsequently, the maintenance personnel may implement fault maintenance by replacing the tire pressure sensor.

Further, based on the implementation, to further improve the diversity and accuracy of the fault detection, based on the previous implementation, the processing module 23 is further specifically configured to obtain an OBD diagnosis result if the first data of the tire pressure sensor meets the first formula and the tire pressure output by the tire pressure sensor in the stopping state meets a current tire pressure reference value, where the OBD diagnosis result includes an OBD fault code; and the processing module 23 is further specifically configured to output a seventh fault signal if a fault code representing an abnormal tire pressure exists in the OBD fault code, where the seventh fault signal is used for representing that the current tire pressure reference value is incorrect.

In this implementation, the tire pressure detection result is obtained based on the tire pressures output by the tire pressure sensors, and with reference to the fault code representing an abnormal tire pressure in the OBD fault code, it is analyzed accurately and reliably whether there is a tire pressure sensor of which the tire pressure reference value is incorrect, and the tire pressure sensor is positioned. Subsequently, the maintenance personnel may implement fault maintenance by resetting the tire pressure reference value of the tire pressure sensor.

Optionally, in still another feasible implementation, based on the solution, fault detection may further be performed on a positioning function of the tire pressure sensors. Optionally, based on any implementation, the first data includes location information of tires where the tire pressure sensors are located in the running state. The processing module 23 is specifically configured to count tire pressure sensors located in left tires and tire pressure sensors located in right tires according to the location information of the tires where the tire pressure sensors are located, and the processing module 23 is further specifically configured to output an eighth fault signal if the quantity of the tire pressure sensors located in the left tires is different from the quantity of the tire pressure sensors located in the right tires, where the eighth fault signal indicates that there is a tire pressure sensor having a positioning fault.

In this implementation, based on the positioning data of the tire pressure sensors obtained in the running state, it is analyzed quickly and accurately whether there is a tire pressure sensor positioned inaccurately, and the tire pressure sensor is positioned.

In addition, based on the solution, fault detection may further be performed on electricity quantities of the tire pressure sensors. Optionally, based on any implementation, the first data includes identifiers of the tire pressure sensors and electricity quantities of the tire pressure sensors. The processing module 23 is specifically configured to, if it is detected that among the tire pressure sensors, there is a sixth tire pressure sensor of which the electricity quantity is less than a preset electricity quantity threshold in the stopping state or the running state, output a ninth fault signal and an identifier of the sixth tire pressure sensor, where the ninth fault signal indicates that there is a tire pressure sensor of which the electricity quantity is insufficient.

In this implementation, based on the electricity quantity data output by the tire pressure sensors obtained in the stopping state or the running state, it is analyzed quickly and accurately whether there is a tire pressure sensor having an insufficient electricity quantity. Subsequently, the maintenance personnel may implement fault maintenance by replacing the tire pressure sensor.

Based on the solution, fault detection may further be performed on whether there is an interfering tire pressure sensor. Optionally, based on any implementation, the first data includes identifiers of the tire pressure sensors and tire pressures output by the tire pressure sensors. The processing module 23 is specifically configured to, if a plurality of pieces of tire pressure information output from a same tire pressure sensor identifier is received in the stopping state or the running state, output a tenth fault signal and an identifier of a seventh tire pressure sensor corresponding to the same identifier, where the plurality of pieces of tire pressure information includes a normal tire pressure and an abnormal tire pressure, and the tenth fault signal indicates that there is a tire pressure sensor having interference.

In this implementation, based on the identifiers of the tire pressure sensors and the tire pressures output by the tire pressure sensors obtained in the stopping state or the running state, it is analyzed quickly and accurately whether there is an interfering tire pressure sensor.

According to the fault detection apparatus provided in this embodiment, related data of tire pressure sensors is obtained when a vehicle is in a stopping state and a running state. According to the data obtained in the stopping state and the running state and a type of fault needing to be detected currently, detection is performed according to a corresponding fault detection process, a specific type of fault occurring currently is determined, and a fault source is accurately positioned. According to the solution, for different fault types, corresponding data is obtained, and detection is performed based on the corresponding fault detection process, so that the fault type can be further refined. Moreover, accurate and reliable fault analysis is performed with reference to data in different states, and a fault type and a fault source can be quickly and accurately positioned, so that maintenance personnel perform fault maintenance quickly and safely, thereby reducing the costs of maintenance and detection, and effectively improving the efficiency and accuracy of fault detection.

The fault detection apparatus described above is configured to perform the fault detection method.

Figure 3A:
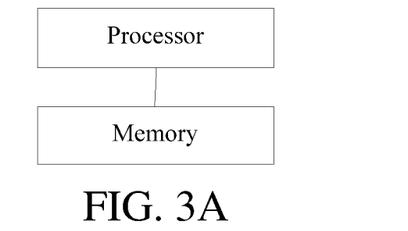
FIG. 3A is a block diagram of a fault detection apparatus according to an exemplary embodiment.

As shown in FIG. 3A, FIG. 3A is a block diagram of a fault detection apparatus according to an exemplary embodiment. As shown in FIG. 3A, the fault detection apparatus may be implemented as:

a processor; and a memory, configured to store a computer program, where the processor executes the computer program to perform the steps of the fault detection method according to any implementation described above.

Figure 3B:
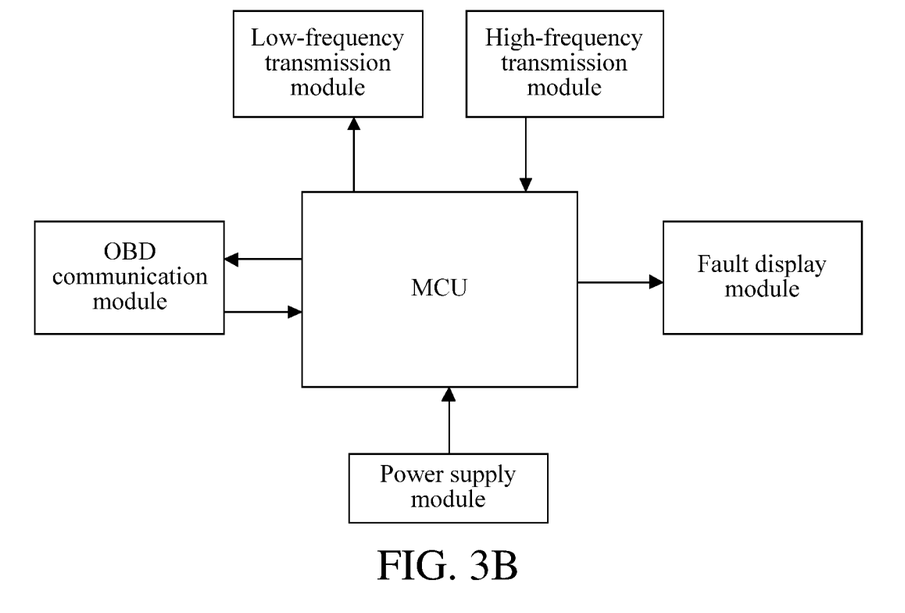
FIG. 3B is a structural diagram of a main body of a fault detection apparatus according to an exemplary embodiment.

In actual application, there may be various manners for specifically implementing the modules of the fault detection apparatus in the foregoing embodiment. The definition and division of the modules in the embodiments of the solution are merely one division manner that can be implemented, and in actual implementation, the division, integration, and connection manner of the modules can be set according to an actual situation as long as the fault detection method provided in the solution can be implemented. Specifically, for example, FIG. 3B is a structural diagram of a main body of a fault detection apparatus according to an exemplary embodiment, and as shown in FIG. 3B, the fault detection apparatus includes an MCU, a low-frequency transmission module, a high-frequency receiving module, an OBD communication module, a fault display module, and a power supply module.

The MCU is mainly configured to perform data processing and fault detection analysis, and in combination with the foregoing embodiment, the MCU may be configured to perform the process performed by the foregoing processing module. In an actual scenario, the tire pressure sensors in the stopping state are mainly triggered in a low-frequency trigger mode, and therefore, in an implementation, the first obtaining module configured to obtain the data in the stopping state may be implemented by the low-frequency transmission module, where the low-frequency transmission module is mainly responsible for the low-frequency trigger of the tire pressure sensors. In addition, the tire pressure sensors in the running state generally interact with the external by using a high-frequency signal. Correspondingly, the second obtaining module configured to obtain the data in the running state may be implemented by the high-frequency receiving module, where the high-frequency receiving module is mainly responsible for receiving the data transmitted by the tire pressure sensors. Further, the OBD communication module is configured to communicate and interact with the OBD and implement communication and interaction with the TCU through the OBD, to obtain data recorded in the ECU and the OBD fault code. In actual application, the OBD communication module may be connected to an OBD connector, and may further implement a bus interaction with the ECU. The fault display module is mainly responsible for displaying the fault detection result. The power supply module may supply power for the entire apparatus.

According to the fault detection apparatus provided in this embodiment, related data of tire pressure sensors is obtained when a vehicle is in a stopping state and a running state. According to the data obtained in the stopping state and/or the running state and a type of fault needing to be detected currently, detection is performed according to a corresponding fault detection process, a specific type of fault occurring currently is determined, and a fault source is accurately positioned. According to the solution, for different fault types, corresponding data is obtained, and detection is performed based on the corresponding fault detection process, so that the fault type can be further refined. Moreover, accurate and reliable fault analysis is performed with reference to data in different states, and a fault type and a fault source can be quickly and accurately positioned, so that maintenance personnel perform fault maintenance quickly and safely, thereby reducing the costs of maintenance and detection, and effectively improving the efficiency and accuracy of fault detection.

A non-temporary computer readable storage medium is provided, storing a computer program. The steps of the foregoing fault detection method according to any implementation is implemented when the computer program is executed by a processor.

It may be clearly understood by a person skilled in the art that, for the purpose of convenient and brief description, for a detailed working process of the foregoing fault detection apparatus, reference may be made to a corresponding process in the foregoing method embodiments.

After considering the specification and practicing the present disclosure, a person skilled in the art would easily conceive of other implementations of the present invention. This application is intended to cover any variations, uses, or adaptations of the present invention following the general principles thereof and including such departures from the present disclosure as common knowledge or customary practice in the art. The specification and the embodiments are considered as merely exemplary, and the real scope and spirit of the present invention are pointed out in the claims.

It should be understood that the present invention is not limited to the precise structures described above and shown in the accompanying drawings, and various modifications and changes can be made without departing from the scope of the present invention. The scope of the present invention is limited only by the appended claims.

What is claimed is:

1. A fault detection method implemented by a computing device, the fault detection method comprising:
obtaining first data of tire pressure sensors of a vehicle in a stopping state and first data of tire pressure sensors of the vehicle in a running state, wherein the first data comprises identifiers of the tire pressure sensors; and
performing fault detection according to the first data of the tire pressure sensors in the stopping state or the running state, and outputting a fault detection result, wherein the performing fault detection according to the first data of the tire pressure sensors in the stopping state or the running state, and outputting a fault detection result comprises:
screening out an identifier of a first tire pressure sensor from the identifiers of the tire pressure sensors obtained in the stopping state, wherein the identifier of the first tire pressure sensor is not comprised in the identifiers of the tire pressure sensors obtained in the running state; outputting a first fault signal and the identifier of the first tire pressure sensor, and lighting up an LED light corresponding to the first fault signal, wherein the first fault signal indicates that there is a tire pressure sensor having a communication fault in the running state; or
detecting whether same identifiers exist in the identifiers of the tire pressure sensors in the stopping state; and outputting a second fault signal if the same identifiers exist, and lighting up an LED light corresponding to the second fault signal wherein the second fault signal indicates that there is a tire pressure sensor whose identifier is incorrectly set.

2. The method according to claim 1, wherein the method further comprises:
obtaining the first data recorded in an electronic control unit (ECU), wherein the first data comprises locations of the tire pressure sensors in the vehicle; and
wherein the performing fault detection according to the first data of the tire pressure sensors in the stopping state, and outputting a fault detection result further comprises:
comparing the identifiers and the locations of the tire pressure sensors in the stopping state with the identifiers and the locations of the tire pressure sensors recorded in the ECU, and collecting statistics about an identifier of a second tire pressure sensor whose identifier or location is inconsistent; and
outputting a third fault signal and the identifier of the second tire pressure sensor, and lighting up an LED light corresponding to the third fault signal, wherein the third fault signal indicates that there is a tire pressure sensor that has not performed learning.

3. The method according to claim 1, wherein the first data further comprises protocol feature points of the tire pressure sensors, and
wherein the performing fault detection according to the first data of the tire pressure sensors in the stopping state or the running state, and outputting a fault detection result further comprises:
obtaining a standard protocol in the stopping state, wherein the standard protocol is a preconfigured interaction protocol between an ECU and the tire pressure sensors of the vehicle in the stopping state; and matching the protocol feature points of the tire pressure sensors in the stopping state with protocol feature points of the standard protocol in the stopping state, and collecting statistics about an identifier of a third tire pressure sensor whose protocol feature point does not match the protocol feature points of the standard protocol; or
obtaining a standard protocol in the running state, wherein the standard protocol is a preconfigured interaction protocol between an ECU and the tire pressure sensors of the vehicle in the running state; and matching the protocol feature points of the tire pressure sensors in the running state with protocol feature points of the standard protocol in the running state, and collecting statistics about an identifier of a third tire pressure sensor whose protocol feature point does not match the protocol feature points of the standard protocol; and outputting a fourth fault signal and the identifier of the third tire pressure sensor, and lighting up an LED light corresponding to the fourth fault signal, wherein the fourth fault signal indicates that there is a tire pressure sensor not matching the interaction protocol.

4. The method according to claim 3, wherein the obtaining a standard protocol in the stopping state comprises:
determining the standard protocol in the stopping state according to a model of the vehicle and/or a model of the tire pressure sensor; or
the obtaining a standard protocol in the running state comprises: determining the standard protocol in the running state according to the model of the vehicle and/or the model of the tire pressure sensor.

5. The method according to claim 1, wherein the first data further comprises tire states output by the tire pressure sensors, and
wherein the performing fault detection according to the first data of the tire pressure sensors in the stopping state or the running state, and outputting a fault detection result further comprises:
detecting current actual states of tires corresponding to the tire pressure sensors;
comparing the tire states output by the tire pressure sensors with the actual states of the tires corresponding to the tire pressure sensors, and collecting statistics about an identifier of a fourth tire pressure sensor corresponding to inconsistent states; and
outputting a fifth fault signal and the identifier of the fourth tire pressure sensor, and lighting up an LED light corresponding to the fifth fault signal, wherein the fifth fault signal indicates that there is a tire pressure sensor having a state detection fault.

6. The method according to claim 1, wherein the method further comprises:
obtaining an on-board diagnostics (OBD) diagnosis result if the first data of the tire pressure sensor meets the first formula and the tire pressure output by the tire pressure sensor in the stopping state meets a current tire pressure reference value, wherein the OBD diagnosis result comprises an OBD fault code; and
outputting a seventh fault signal and lighting up an LED light corresponding to the seventh fault signal if a fault code indicating a tire pressure exception exists in the OBD fault code, wherein the seventh fault signal is used for indicating that the current tire pressure reference value is incorrect.

7. The method according to claim 1, wherein the first data comprises location information of tires where the tire pressure sensors are located, and
wherein the performing fault detection according to the first data of the tire pressure sensors in the running state, and outputting a fault detection result further comprises:
counting tire pressure sensors located in left tires and tire pressure sensors located in right tires according to the location information of the tires where the tire pressure sensors are located in the running state; and
outputting an eighth fault signal and lighting up an LED light corresponding to the eighth fault signal if the quantity of the tire pressure sensors located in the left tires is different from the quantity of the tire pressure sensors located in the right tires, wherein the eighth fault signal indicates that there is a tire pressure sensor having a positioning fault.

8. The method according to claim 1, wherein the first data further comprises electricity quantities of the tire pressure sensors, and
wherein the performing fault detection according to the first data of the tire pressure sensors in the stopping state or the running state, and outputting a fault detection result further comprises:
if it is detected that among the tire pressure sensors, there is a sixth tire pressure sensor of which the electricity quantity is less than a preset electricity quantity threshold in the stopping state or the running state, outputting a ninth fault signal and an identifier of the sixth tire pressure sensor, and lighting up an LED light corresponding to the ninth fault signal, wherein the ninth fault signal indicates that there is a tire pressure sensor of which the electricity quantity is insufficient.

9. The method according to claim 1, wherein the first data further comprises tire pressures output by the tire pressure sensors, and
wherein the performing fault detection according to the first data of the tire pressure sensors in the stopping state or the running state, and outputting a fault detection result further comprises:
if a plurality of pieces of tire pressure information output from a same tire pressure sensor identifier is received in the stopping state or the running state, outputting a tenth fault signal and an identifier of a seventh tire pressure sensor corresponding to the same identifier, and lighting up an LED light corresponding to the tenth fault signal, wherein the plurality of pieces of tire pressure information comprises a normal tire pressure and an abnormal tire pressure, and the tenth fault signal indicates that there is a tire pressure sensor having interference.

10. The method according to claim 1, wherein the obtaining first data of tire pressure sensors in a stopping state of a vehicle comprises:
sending a low-frequency trigger signal to the tire pressure sensors when the vehicle is in the stopping state; and
receiving the first data of the tire pressure sensors in the stopping state returned by the tire pressure sensors according to the low-frequency trigger signal.

11. The method according to claim 1, wherein the obtaining first data of tire pressure sensors in a running state of a vehicle comprises:
receiving high-frequency signals sent by the tire pressure sensors when the vehicle is in the running state; and
parsing the high-frequency signals to obtain the first data of the tire pressure sensors in the running state.

12. A fault detection apparatus, comprising:
a processor; and
a memory, configured to store a computer program;
wherein the processor executes the computer program to perform the steps:
obtaining first data of tire pressure sensors of a vehicle in a stopping state and first data of tire pressure sensors of the vehicle in a running state, wherein the first data comprises identifiers of the tire pressure sensors; and
performing fault detection according to the first data of the tire pressure sensors in the stopping state or the running state, and outputting a fault detection result, wherein the performing step and the outputting step comprise:

screening out an identifier of a first tire pressure sensor from the identifiers of the tire pressure sensors obtained in the stopping state, wherein the identifier of the first tire pressure sensor is not comprised in the identifiers of the tire pressure sensors obtained in the running state; and outputting a first fault signal and the identifier of the first tire pressure sensor, and lighting up an LED light corresponding to the first fault signal, wherein the first fault signal indicates that there is a tire pressure sensor having a communication fault in the running state; or detecting whether same identifiers exist in the identifiers of the tire pressure sensors in the stopping state; and outputting a second fault signal if the same identifiers exist, and lighting up an LED light corresponding to the second fault signal, wherein the second fault signal indicates that there is a tire pressure sensor whose identifier is incorrectly set.

13. The fault detection apparatus according to claim 12, wherein the obtaining first data of tire pressure sensors in a stopping state of a vehicle comprises:

sending a low-frequency trigger signal to the tire pressure sensors when the vehicle is in the stopping state; and receiving the first data of the tire pressure sensors in the stopping state returned by the tire pressure sensors according to the low-frequency trigger signal.

14. The fault detection apparatus according to claim 12, wherein the obtaining first data of tire pressure sensors in a running state of a vehicle comprises:

receiving high-frequency signals sent by the tire pressure sensors when the vehicle is in the running state; and parsing the high-frequency signals to obtain the first data of the tire pressure sensors in the running state.

15. A non-transitory computer-readable storage medium, storing a computer program, wherein when the program is executed by a processor, the steps of obtaining first data of tire pressure sensors of a vehicle in a stopping state and first data of tire pressure sensors of the vehicle in a running state; and performing fault detection according to the first data of the tire pressure sensors in the stopping state or the running state, and outputting a fault detection result are implemented, wherein the first data comprises identifiers of the tire pressure sensors, and wherein the performing step and the outputting step comprise:

screening out an identifier of a first tire pressure sensor from the identifiers of the tire pressure sensors obtained in the stopping state, wherein the identifier of the first tire pressure sensor is not comprised in the identifiers of the tire pressure sensors obtained in the running state; and outputting a first fault signal and the identifier of the first tire pressure sensor, and lighting up an LED light corresponding to the first fault signal, wherein the first fault signal indicates that there is a tire pressure sensor having a communication fault in the running state; or detecting whether same identifiers exist in the identifiers of the tire pressure sensors in the stopping state; and outputting a second fault signal if the same identifiers exist, and lighting up an LED light corresponding to the second fault signal, wherein the second fault signal indicates that there is a tire pressure sensor whose identifier is incorrectly set.

16. The non-transitory computer-readable storage medium according to claim 15, wherein the obtaining first data of tire pressure sensors in a stopping state of a vehicle comprises:

sending a low-frequency trigger signal to the tire pressure sensors when the vehicle is in the stopping state; and receiving the first data of the tire pressure sensors in the stopping state returned by the tire pressure sensors according to the low-frequency trigger signal.

17. The non-transitory computer-readable storage medium according to claim 15, wherein the obtaining first data of tire pressure sensors in a running state of a vehicle comprises:

receiving high-frequency signals sent by the tire pressure sensors when the vehicle is in the running state; and parsing the high-frequency signals to obtain the first data of the tire pressure sensors in the running state.

* * * * *